United States Patent
Che et al.

(10) Patent No.: US 8,111,656 B2
(45) Date of Patent: Feb. 7, 2012

(54) METHOD AND APPARATUS FOR PROVIDING RANDOM ACCESS WINDOW CONFIGURATION

(75) Inventors: Xiang Guang Che, Beijing (CN); Yong Teng, Beijing (CN); Min Huang, Beijing (CN)

(73) Assignee: Nokia Corporation, Espoo (FI)

( * ) Notice: Subject to any disclaimer, the term of this patent is extended or adjusted under 35 U.S.C. 154(b) by 80 days.

(21) Appl. No.: 12/434,245

(22) Filed: May 1, 2009

(65) Prior Publication Data

US 2009/0303896 A1    Dec. 10, 2009

Related U.S. Application Data

(60) Provisional application No. 61/050,051, filed on May 2, 2008, provisional application No. 60/051,559, filed on May 8, 2008.

(51) Int. Cl.
*H04W 4/00*    (2009.01)
*H04L 12/28*    (2006.01)

(52) U.S. Cl. .................... 370/329; 370/395.4

(58) Field of Classification Search .............. 370/328, 370/329, 341, 344, 345, 431, 432, 203, 208, 370/209, 468, 216, 241; 455/101; 714/48, 714/746, 752, 751, 758, 748, 749
See application file for complete search history.

(56) References Cited

U.S. PATENT DOCUMENTS

2008/0273610 A1 * 11/2008 Malladi et al. ............. 375/260
2010/0002590 A1 * 1/2010 Park et al. .................. 370/241

FOREIGN PATENT DOCUMENTS

WO    WO 2008/024788 A2    2/2008

OTHER PUBLICATIONS

Third Office Action for Chinese Patent Application No. 200910149759, dated Aug. 3, 2011.
Second Office Action for Chinese Patent Application No. 200910149759, issued Mar. 29, 2011.

* cited by examiner

*Primary Examiner* — Hanh Nguyen
(74) *Attorney, Agent, or Firm* — Alston & Bird LLP

(57) ABSTRACT

An approach is provided for providing random access window configuration by estimating a processing time margin for processing random access preambles received in one or more random access channels. The estimated processing time margin is then used to offset the respective random access window configuration.

20 Claims, 12 Drawing Sheets

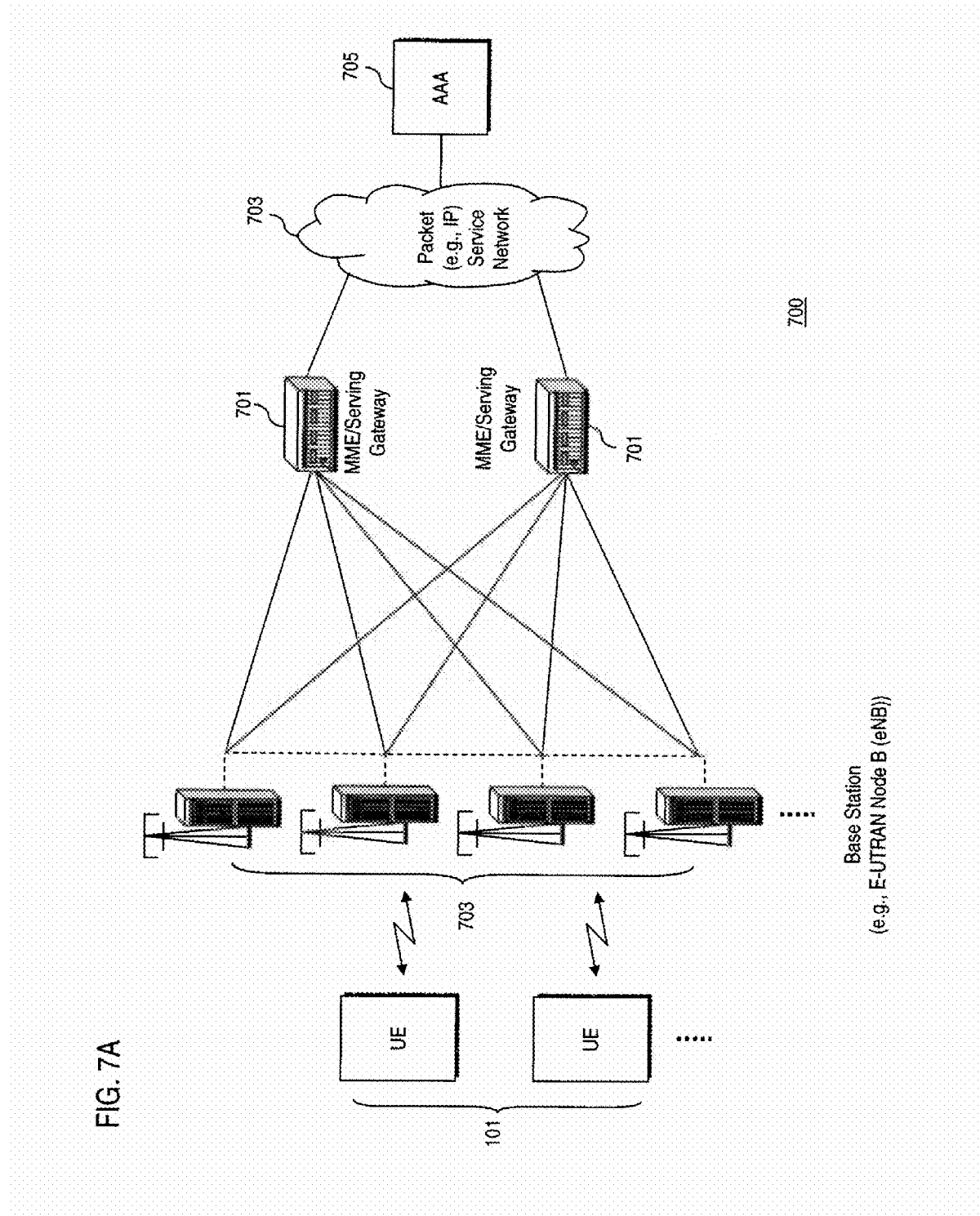

METHOD AND APPARATUS FOR PROVIDING RANDOM ACCESS WINDOW CONFIGURATION

RELATED APPLICATIONS

This application claims the benefit of the earlier filing dates under 35 U.S.C. §119(e) of U.S. Provisional Application Ser. No. 61/050,051 filed May 2, 2008, entitled "Method and Apparatus for Providing Random Access Window Configuration," and of U.S. Provisional Application Ser. No. 61/051,559 filed May 8, 2008, entitled "Method and Apparatus for Providing Random Access Window Configuration," the entirety of which are incorporated herein by reference.

BACKGROUND

Radio communication systems, such as wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of interest is the allocation of resources for random access channels; traditional approaches, under some circumstances, have resulted in greater complexity and higher overhead.

SOME EXEMPLARY EMBODIMENTS

Therefore, there is a need for an approach for providing efficient signaling of resource allocations for random access channels, which can co-exist with already developed standards and protocols.

According to one embodiment, a method comprises initiating transmission of one or more random access preambles on one or more respective random access channels within one or more random access preambles on one or more respective random access channels within a single uplink subframe. The method also comprises monitoring a physical downlink control channel for a response to the transmission during one or more random access response windows corresponding to each respective random access channel. The one or more random access response windows are offset by an estimated processing time margin for processing the random access preambles and the response.

According to another embodiment, an apparatus comprises at least one processor and at least one memory including computer program code, the at least one memory and the computer program code configured to, with the at least one processor, cause the apparatus to initiate transmission of one or more random access preambles in one or more respective random access channels within a single uplink subframe. The apparatus is further caused to monitor a physical downlink control channel for a response to the transmission during one or more random access response windows corresponding to each respective random access channel. The one or more random access response windows are offset by an estimated processing time margin for processing the random access preambles and the response.

According to another embodiment, an apparatus comprises means for initiating transmission of one or more random access preambles in one or more respective random access channels within a single uplink subframe. The apparatus also comprises means for monitoring a physical downlink control channel for a response to the transmission during one or more random access response windows corresponding to each respective random access channel. The one or more random access response windows are offset by an estimated processing time margin for processing the random access preambles and the response.

According to another embodiment, an apparatus comprises at least one processor and at least one memory including computer program code, the at least one memory and the computer program code configured to, with the at least one processor, cause the apparatus to receive a plurality of random access preambles corresponding to a plurality of random access channels within a single uplink subframe. The apparatus is also caused to determine an estimated processing time margin for processing the random access preambles. The apparatus is further caused to determine an offset for a plurality of random access response windows corresponding to the random access channels based on the estimated processing time margin.

According to another embodiment, a method comprises receiving a plurality of random access preambles corresponding to a plurality of random access channels within a single uplink subframe. The method also comprises determining an estimated processing time margin for processing the random access preambles. The method further comprises determining an offset for a plurality of random access response windows corresponding to the random access channels based on the estimated processing time margin.

According to yet another embodiment, an apparatus comprises means for receiving a plurality of random access preambles corresponding to a plurality of random access channels within a single uplink subframe. The apparatus also comprises means for determining an estimated processing time margin for processing the random access preambles. The apparatus further comprises means for determining an offset for a plurality of random access response windows corresponding to the random access channels based on the estimated processing time margin.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7D are diagrams of communication systems having exemplary long-term evolution (LTE) architectures, in which the system of FIG. 1 can operate, according to various exemplary embodiments of the invention;

DESCRIPTION OF PREFERRED EMBODIMENT

An apparatus, method, and software for providing random access window configuration are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a communication network having a Third Generation Partnership Project (3GPP) Long Term Evolution (LTE) architecture or Evolved Universal Terrestrial Radio Access Network (E-UTRAN) architecture, it is recognized by one of ordinary skill in the art that the embodiments of the inventions have applicability to any type of packet based communication system and equivalent functional capabilities.

Figure 1:
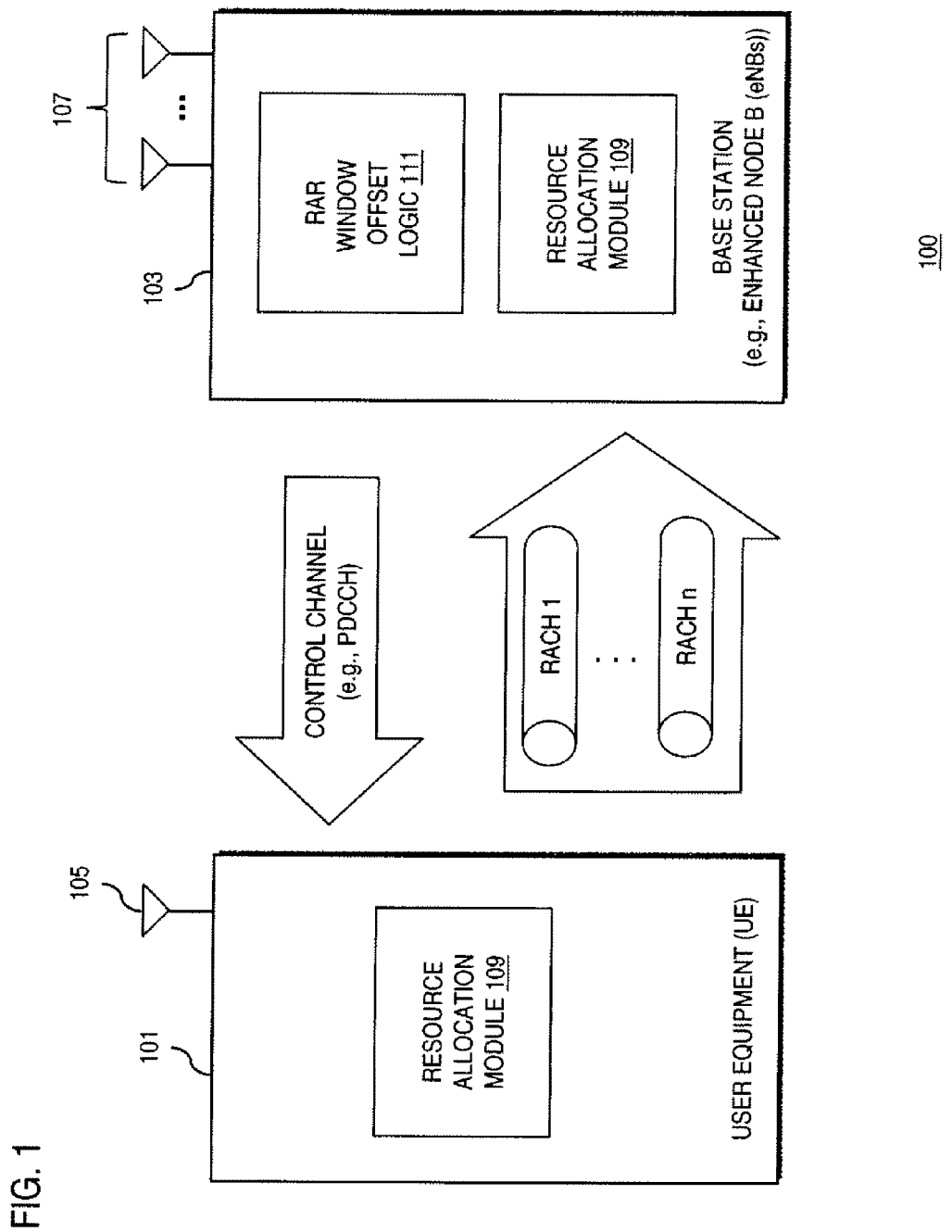
FIG. 1 is a diagram of a communication system capable of providing random access window configuration, according to an exemplary embodiment.

FIG. 1 is a diagram of a communication system capable of providing random access window configuration, according to an exemplary embodiment. As shown in FIG. 1, one or more user equipment (UEs) 101 communicate with a base station 103, which is part of an access network (e.g., 3GPP LTE or E-UTRAN, etc.). Under the 3GPP LTE architecture (as shown in FIGS. 7A-7D), the base station 103 is denoted as an enhanced Node B (eNB). The UE 101 can be any type of mobile stations, such as handsets, terminals, stations, units, devices, multimedia tablets, Internet nodes, communicators, Personal Digital Assistants (PDAs) or any type of interface to the user (such as "wearable" circuitry, etc.). The UE 101 includes a transceiver (not shown) and an antenna system 105 that couples to the transceiver to receive or transmit signals from the base station 103; the antenna system 105 can include one or more antennas.

As with the UE 101, the base station 103 employs a transceiver (not shown), which transmits information to the UE 101. Also, the base station 103 can employ one or more antennas 107 for transmitting and receiving electromagnetic signals. For instance, the Node B 103 may utilize a Multiple Input Multiple Output (MIMO) antenna system 107, whereby the Node B 103 can support multiple antenna transmit and receive capabilities. This arrangement can support the parallel transmission of independent data streams to achieve high data rates between the UE 101 and Node B 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

The system 100 of FIG. 1, in certain embodiments, uses concatenation of Forward Error Correction (FEC) coding and an Automatic Repeat Request (ARQ) protocol commonly known as Hybrid ARQ (HARQ). Automatic Repeat Request (ARQ) is an error detection mechanism using error detection logic. This mechanism permits the receiver to indicate to the transmitter that a packet or sub-packet has been received incorrectly, and thus, the receiver can request the transmitter to resend the particular packet(s). This can be accomplished with a Stop and Wait (SAW) procedure, in which the transmitter waits for a response from the receiver before sending or resending packets. The erroneous packets are used in conjunction with retransmitted packets.

The approach described herein, according to certain embodiments, relate to a long term evolution (LTE) architecture of 3GPP. By way of example, the approach is explained in the context of a time division duplex (TDD) mode of 3GPP with respect to random access response (RAR) windows. These windows are utilized in the random access (RA) procedure, and are responsible for regulating the time interval when the UE 101 monitors a physical downlink control channel (PDCCH) for a response from, for instance, the eNB 103 after transmitting a random access preamble (RA preamble) in a random access channel (RACH). As shown in FIG. 1, the UE 101 includes a resource allocation module 109 for performing the RA procedure. Similarly, the eNB 103 also includes a resource allocation module 109 to perform the RA procedure. In addition, the eNB 103 includes a RAR window offset logic 111 to determine offsets for the RAR windows based on an estimated processing time margin for the eNB 103 to perform its functions as part the RA procedure.

In the random access procedure, the first UE 101 transmits a RA preamble in a random access channel. The UE 101 then monitors a control channel (e.g., a PDCCH) for the duration of a RAR window corresponding to the random access channel in which the preamble was transmitted. According to certain embodiments, a RAR window is a predetermined transmission time interval (TTI) window (e.g., a radio sub-frame window) during which the UE 101 monitors the control channel (e.g., PDCCH) for a possible RA response from, for instance, the eNB 103. The length and the location of a RAR window depend on two parameters: (1) a window begin parameter (e.g., RA_WINDOW_BEGIN), and (2) a window end parameter (e.g., RA_WINDOW_END). These parameters are defined in 3GPP TS 36.321 v8.1.0 (which is incorporated herein by reference in its entirety). In exemplary embodiments, the UE 101 stops monitoring for the PDCCH after successful reception of a RAR corresponding to the RA preamble transmission. If the UE 101 does not receive a RA response or the response is otherwise invalid (e.g., the RA preamble identifiers in the received RA response do not match the transmitted RA preambles), the RA response reception is determined to be unsuccessful. The UE 101 then, for instance, retransmits the RA preambles.

The configuration (e.g., determining the start and/or duration) of the RAR window can affect when and if the UE 101 will retransmit RA preambles. For example, if the RAR window is too short, the UE 101 may have to perform unnecessary retransmissions because the RAR window times out before a response can be received. If the RAR window is too long, the UE 101 may unnecessarily expend resources monitoring the PDCCH for a response. In a traditional RA procedure using frequency division duplexing (FDD), the start (e.g., the window begin parameter) of a RAR window is the third subframe after the end of the RA preamble transmission (e.g., end of RA preamble transmission +2 ms), and the length of the RAR window is no longer than 10 subframes (e.g., 10 ms). In FDD mode, at most one RACH resource can be allocated per subframe. In contrast, TDD mode permits more than one RACH resource to be allocated in the same uplink subframe. In practice, the number of RACH resources that can be allocated in one TDD subframe is typically limited to at most six to maintain a balance between uplink and downlink subframes in any one frame. For TDD, the traditional approach to configuring a RAR window by assigning a fixed time interval is not adequate because multiple RAR windows can defined in the same transmission time interval period when there are multiple RACH resources allocated in one uplink subframe.

In the "hardest" case (e.g. all 64 preambles of one RACH channel are from 64 root sequences and six RACH channel in one UL subframe), the eNB 103 may not be able to process all RACH resources in the time provided by a traditionally configured RAR window. Accordingly, the eNB 103 will not be able to provide a RA response even though the eNB 103 has successfully received the RA preambles from the UE 101. In the absence of a RA response within the RAR window, the UE 101 assumes that the RA preamble transmission has failed and will retransmit the RA preambles. If the failure to respond is due to processing delays, the retransmissions can be unnecessary and can cause more interference and longer access delays.

One approach is to extend the length of the RAR window to more than the 10 ms (e.g., length of a frame) traditionally used in TDD to leave sufficient time for the eNB 103 process the RA preambles. However, because TDD cells are always synchronized, a RAR window longer than 10 ms makes the RA-RNTI (random access—radio network temporary identity) design for the handover case extremely challenging because the traditional radio architecture does not require the UE 101 to read a SFN (single frequency network) from neighboring cells during handover. Therefore, configuring the RAR window to extend more than 10 ms (e.g., the length of one subframe) would be complex and can potentially degrade RA performance over the radio network.

To address the above issues, the system 100 estimates a processing time margin for the eNB 103 to process RA preambles received from the UE 101 and then offsets the RAR windows based on the estimated processing time margin. More specifically, in one embodiment, for the RACH configuration in which there are multiple RACH resources allocated in a single uplink subframe, the RAR windows are time shifted by introducing a parameter T_Process_Time to the TDD RAR window configuration. This RAR window offset mechanism of system 100 can provide comparable performance (e.g., as measured by RACH resource amount, delay, etc.) as those for FDD without significantly increasing the overall complexity of the radio framework.

Figure 2:
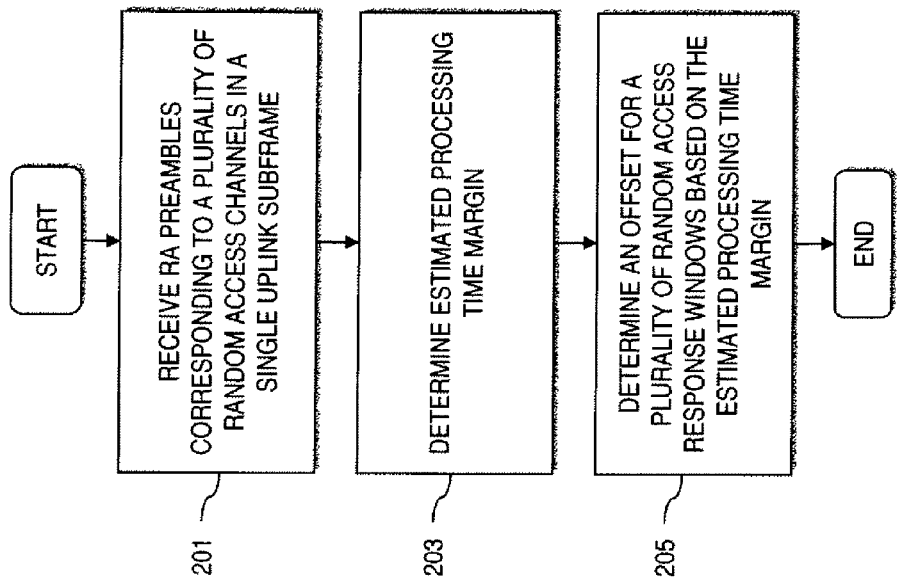
FIG. 2 is flowchart of a process for offsetting random access response (RAR) windows, according to an exemplary embodiment.

FIG. 2 is flowchart of a process for offsetting random access response (RAR) windows, according to an exemplary embodiment. In step 201, the eNB 103 receives one or more RA preambles corresponding to one or more random access channels in, for instance, a single uplink subframe. In exemplary of embodiments, the RA preambles are received from the UE 101 as part of the RA procedure. The RAR window offset logic III then determines an estimated processing time margin (e.g., the parameter T_Process_Time) for processing the received RA preambles (step 203). The parameter T_Process_Time can be set, for example, from 0 to 2 ms, with the step size of 1 ms or even a fraction of 1 ms to allow time for processing each preamble and preparing a corresponding RA response. After determining the processing time, the RAR window offset logic 111 determines the offset for the RAR windows based on the determined processing time (e.g., T_Process_Time).

In exemplary embodiments, the offset is determined by calculating a begin window parameter (e.g., RA_WINDOW_BEGIN) according to the following equation: RA_WINDOW_BEGIN=RA_PREAMBLE_END+2 ms+RACH_index * T_Process_Time, where RA_PREAMBLE_END denotes the time instance of the end of the respective RA preamble transmission (e.g., expressed as a subframe index), RACH_index is a sequential index of each RACH in the uplink subframe (e.g., 0 to 5), and T_Process_Time is the estimated processing time margin. In other words the begin window parameter is variable offset for each RACH. As discussed previously, the offset provides the eNB 103 the flexibility to adjust or shift the RAR window to avoid unnecessary retransmission of the RA preambles by the UE 101. The offset can be determined to avoid starting the RAR windows at the same time to minimize potential collisions. In certain embodiments, the RAR window offset logic 111 calculates an offset to produce non-overlapping RAR windows. For example, if offset is based on a processing time of 0.5 ms, then the window for RACH 0 and RACH 1 would start together and the windows for RACH 2 and RACH 3 would start 1 ms later. It is noted that when the offset is based on a T_Process_Time of zero, the RAR window timing becomes the same as in the traditional non-offset case. In exemplary embodiments, the end window parameter (e.g., RA_WINDOW_END) is then determined based on the RA_WINDOW_END. For example, the end window parameter may be a fixed time interval (e.g., 10 ms) or a calculated time interval after the begin window parameter.

For comparison, the traditional approach determines the start of RAR window as a fixed value (2 ms) after the RA preamble transmission according to the following example equation:
RA_WINDOW_BEGIN=RA_PREAMBLE_END+2 subframes. Under this scenario, the constant "2 subframes" is derived by determining the time span for the eNB 103 to process the received RA preamble. In the case of TDD, it is possible the eNB 103 will receive and then must simultaneously process multiple RA preambles corresponding to multiple RACHs (e.g., at most six, but five is assumed here for comparison) received in the same uplink subframe. To perform this simultaneous processing of multiple RA preambles, the eNB 103 uses significantly more processing power than when processing only one RA preamble at a time. The offset mechanism described herein enables the eNB 103 to offset the RAR windows for processing RA preambles so that the RA preambles received in a single uplink subframe need not be processed simultaneously. Instead, the eNB 103 can distribute the processing burden over a longer time period, thereby reducing the processing power needed to process the RA preambles at a given time.

Further, it is observed that when using the offset mechanism, the RAR windows with the same RACH index may not overlap as long as the length of window is, for instance, no more than 10 ms (e.g., the length of one subframe). Thus, no additional processing capability (as well as RA-RNTI) is needed compared with the traditional case wherein one RA preamble is processed at a time. Moreover, the start of RAR window need not be a downlink subframe, as long as there is one or more downlink subframes during the entire window, since the RA response can be mapped into any PDCCH.

Figure 3:
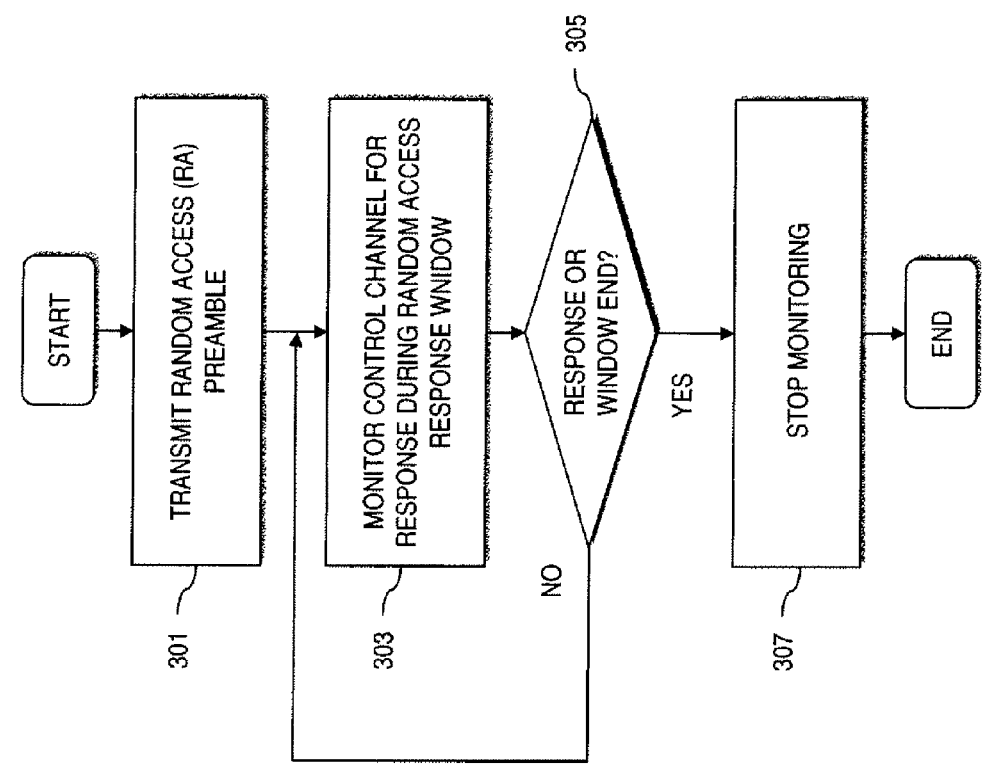
FIG. 3 is a flowchart of random access procedure using a RAR window offset mechanism, according to an exemplary embodiment.

FIG. 3 is a flowchart of random access procedure using a RAR window offset mechanism, according to an exemplary embodiment. In step 301, the UE 101 begins the RA procedure by, for instance, initiating transmission of one or more RA preambles in one or more respective RACHs within a single uplink subframe. In exemplary embodiments, the one or more RACHs are established over a radio network that has an LTE architecture. As discussed previously, it is contemplated that the offset mechanism described herein is applicable to any communication network. Following the transmission of step 301, the UE 101 begins monitoring a PDCCH for a RA response to the transmission (step 303). In exemplary embodiments, the UE 101 monitors the PDCCH for the duration of a corresponding RAR window. In this example, the RAR window or windows are offset by an estimated processing time margin as described with respect to FIG. 2. This offset minimizes the potential for unnecessary retransmission of RA preambles by the UE 101 by enabling the eNB 103 to configure the RAR windows based on the estimated time for processing and responding to the RA preambles transmitted by the UE 101. For example, if the eNB 103 determines the estimated processing time margin for responding to six RA preambles received in six respective RACHs is 2 ms, the eNB 103 offsets the corresponding RAR windows accordingly. The offset enables the eNB 103 to stagger the processing burden associated with responding to the simultaneous RA preamble transmissions and then transmit timely RA responses to the UE 101. If the UE 101 receives a RA response or if the respective RAR window ends (step 305), the UE 101 stops monitoring the PDCCH (step 307). If the UE 101 does not receive a RA response within the respective RAR window, the UE 101 retransmits the corresponding RA preamble.

Figure 4:
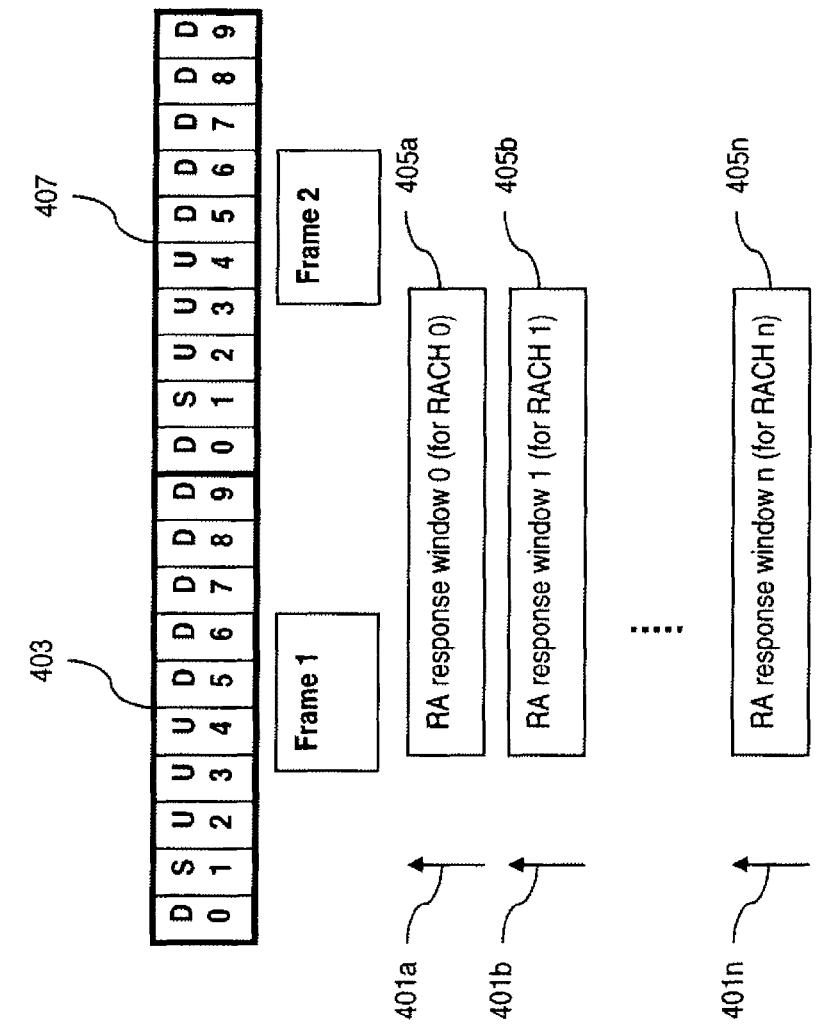
FIG. 4 is a diagram of a RAR window configuration with fixed start offsets in Time Division Duplex (TDD), according to an exemplary embodiment.

FIG. 4 is a diagram of a RAR window configuration with fixed start offsets in Time Division Duplex (TDD), according to an exemplary embodiment. FIG. 4 depicts RAR windows configured using the traditional approach of assigning a fixed begin window parameter for each RA window. As shown in FIG. 4, RA preambles 40a-401n are transmitted in respective RACHs in the same uplink subframe (e.g., at subframe 1 of the first subframe 403). In this example, an RAR window is configured to begin two subframes (e.g., 2 ms) from the end of the RA preamble transmission and last for 10 ms. Accordingly, the RAR windows 405a-405n corresponding to the simultaneously transmitted RA preambles 401a-401n all begin at the same subframe (e.g., subframe 4 of the first subframe 403) and extend 10 ms through subframe 3 of the second subframe 407. In this configuration, the eNB 103 processes all RA preambles 401a-401n simultaneously in order to respond to the UE 101 within the allotted RAR windows. This simultaneous processing requires significant processing power and can result in the eNB 103 not being able to meet the RAR window because of processing delays.

Figure 5:
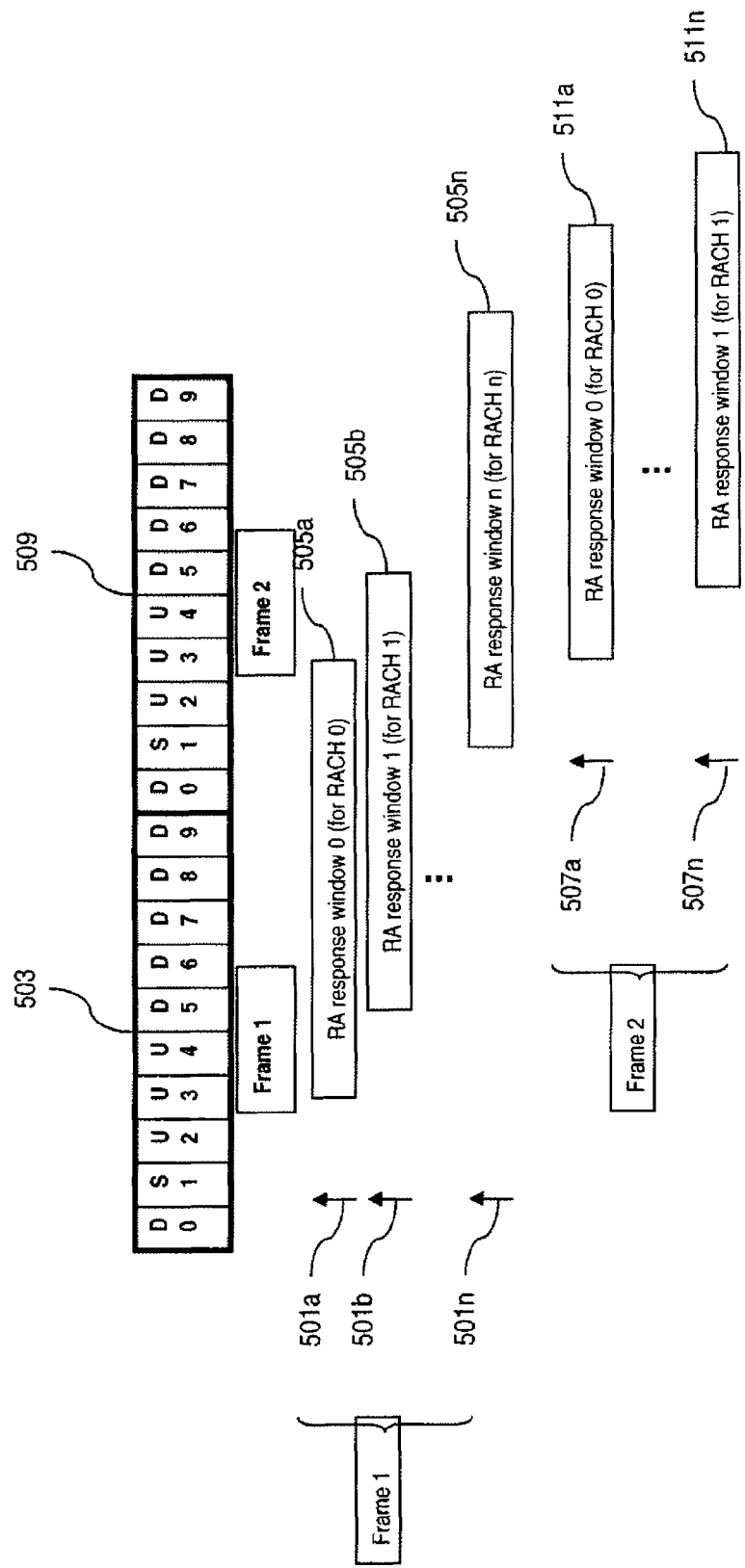
FIG. 5 is a diagram of a RAR window configuration with variable start offsets in Time Division Duplex (TDD), according to an exemplary embodiment.

FIG. 5 is a diagram of a RAR window configuration with variable start offsets in Time Division Duplex (TDD), according to an exemplary embodiment. As in the example of FIG. 4, RA preambles 501a-501n are transmitted in respective RACHs in the same uplink subframe (e.g., at subframe 1 of the first subframe 503). In this example, the RAR windows 505a-505n for responding to the respective RA preambles 501a-501n is variably offset according to the process described with respect to FIG. 2. Even though the RA preambles 501a-501n are transmitted at the same time, the corresponding RAR windows 505a-505n have different start times that are staggered according to the determined offset. The offset process can repeat for each radio subframe. For example, a second set of RA preambles 507a-507n is transmitted in the sample uplink subframe (e.g., at subframe I of the second frame 509). The corresponding RAR windows 511a-511n are also offset accordingly. In this way, the RAR windows 505a-505n and 511a-511n can be spread out over a longer period of time to avoid forcing the eNB 103 to process the RA preambles 501a-501n and 507a-507n simultaneously. In certain embodiments, the RAR windows 505a-505n and 511a-511n can be configured to not overlap. In this case, the processing power required to respond to multiple RA preambles in TDD is no greater than the processing power required to respond to a single RA preamble in FDD.

Figure 6:
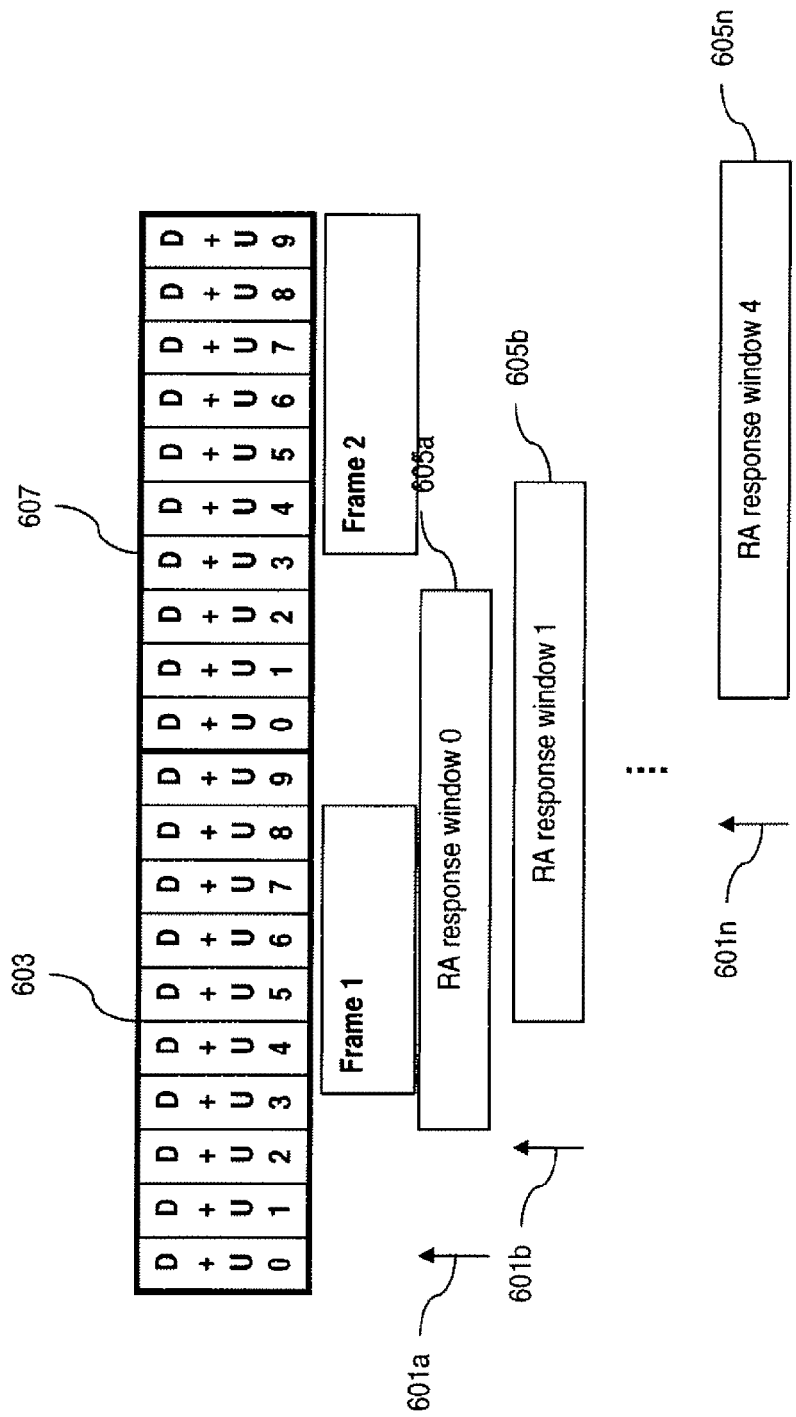
FIG. 6 is a diagram of a RAR window configuration with fixed start offsets in Frequency Division Duplex (FDD), according to an exemplary embodiment.

FIG. 6 is a diagram of a RAR window configuration with fixed start offsets in Frequency Division Duplex (FDD), according to an exemplary embodiment. In FDD, the radio network permits only one RA preamble transmission per subframe. In this example, the eNB 103 is configured to operate in FDD mode and to begin a RAR window at a fixed time interval (e.g., 2 subframes or 2 ms) following transmission of the respective RA preamble. As shown in FIG. 6, a RA preamble 601 a is transmitted in subframe 0 of the first subframe 603. Accordingly, the respective RAR window 605a begins at subframe 3 and extends through subframe 2 of the second subframe 607. Similarly, a RA preamble 601b is transmitted in subframe 2 and the corresponding RAR window 607b begins in subframe 5; and a RA preamble 601n is transmitted in subframe 8 and the corresponding RAR window 605n begins in subframe 1 of the second subframe 607. Because only one RA preamble is transmitted in a subframe in FDD, the RAR windows 605a-605n are, as a matter of course, staggered with no two RAR window starting in the same subframe. As a result, the eNB 103 operating in FDD does not require the same increased level of processing power that an eNB 103 operating in a TDD mode that has to process simultaneous RA preambles would.

As comparison, the offset mechanism described in FIG. 2 with respect to a RA procedure in TDD is similar to the RA procedure in FDD. More specifically, the approach described herein provides similar RAR window profiles in TDD to that in FDD, which means that the comparable RA opportunities and performance are provided to the UE 101 in both TDD and FDD.

The architecture compliant with the UMTS terrestrial radio access network (UTRAN) or Evolved UTRAN (E-UTRAN) in 3GPP, are more fully described below with respect to FIGS. 7A-7D.

FIGS. 7A-7D are diagrams of communication systems having exemplary long-term evolution (LTE) architectures, in which the user equipment (UE) and the base station of FIG. 1 can operate, according to various exemplary embodiments of the invention. By way of example (shown in FIG. 7A), a base station (e.g., destination node 103) and a user equipment (UE) (e.g., source node 101) can communicate in system 700 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

The communication system 700 is compliant with 3GPP LTE, entitled "Long Term Evolution of the 3GPP Radio Technology" (which is incorporated herein by reference in its entirety). As shown in FIG. 7A, one or more user equipment (UEs) 101 communicate with a network equipment, such as a base station 103, which is part of an access network (e.g., WiMAX (Worldwide Interoperability for Microwave Access), 3GPP LTE (or E-UTRAN or 8.9 G), etc.). Under the 3GPP LTE architecture, a base station is denoted as an enhanced Node B (eNB) 103.

MME (Mobile Management Entity)/Serving Gateways 701 are connected to the eNBs 103 in a full or partial mesh configuration using tunneling over a packet transport network (e.g., Internet Protocol (IP) network) 703. Exemplary functions of the MME/Serving GW 701 include distribution of paging messages to the eNBs 103, termination of U-plane packets for paging reasons, and switching of U-plane for support of UE mobility. Since the GWs 701 serve as a gateway to external networks, e.g., the Internet or private networks 703, the GWs 701 include an Access, Authorization and Accounting system (AAA) 705 to securely determine the identity and privileges of a user and to track each user's activities. Namely, the MME Serving Gateway 701 is the key control-node for the LTE access-network and is responsible for idle mode UE tracking and paging procedure including retransmissions. Also, the MME 701 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 7B:
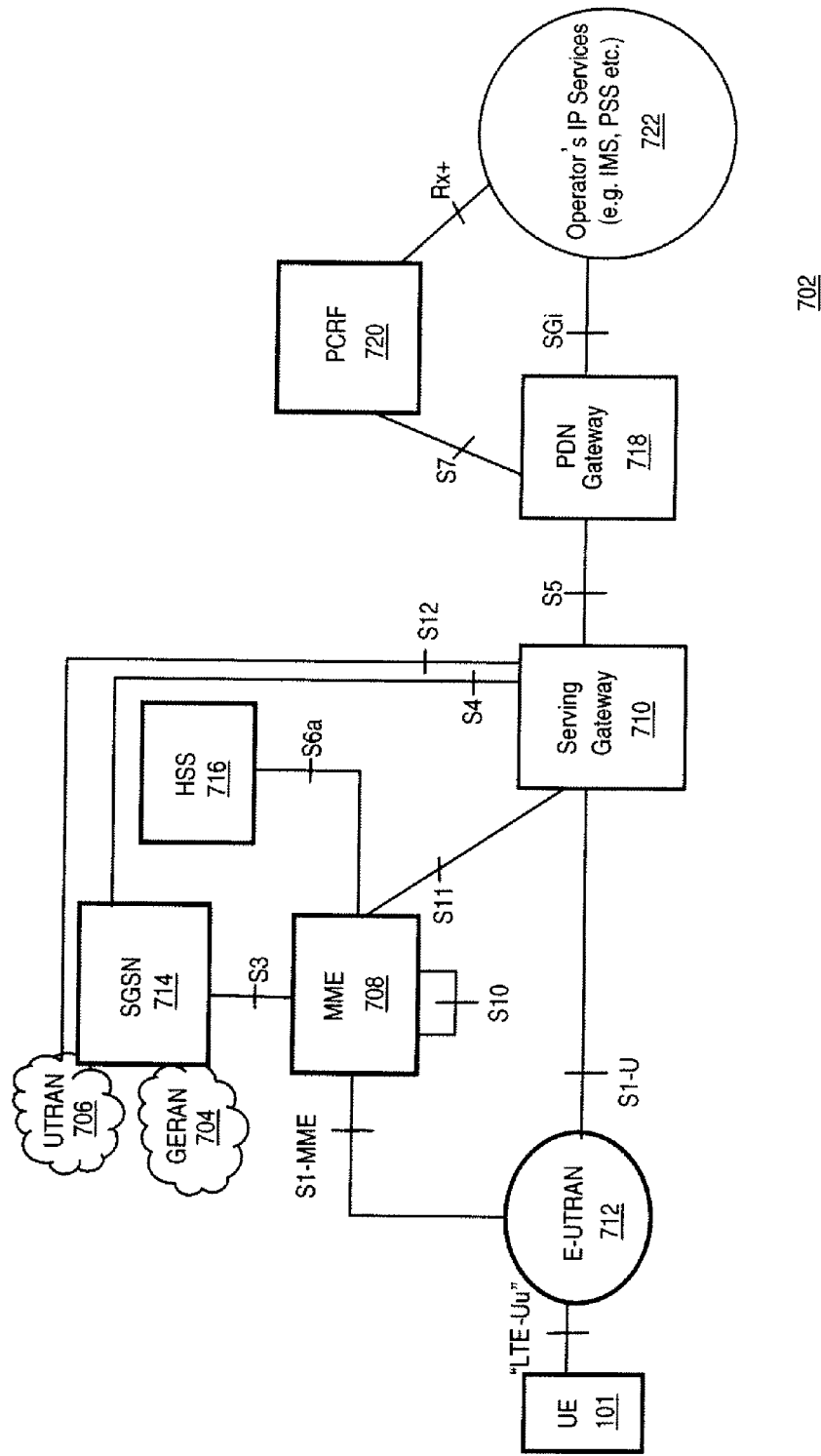

In FIG. 7B, a communication system 702 supports GERAN (GSM/EDGE radio access) 704, and UTRAN 706 based access networks, E-UTRAN 712 and non-3GPP (not shown) based access networks, and is more fully described in TR 23.882, which is incorporated herein by reference in its entirety. A key feature of this system is the separation of the network entity that performs control-plane functionality (MME 708) from the network entity that performs bearer-plane functionality (Serving Gateway 710) with a well defined open interface between them S11. Since E-UTRAN 712 provides higher bandwidths to enable new services as well as to improve existing ones, separation of MME 708 from Serving Gateway 710 implies that Serving Gateway 710 can be based on a platform optimized for signaling transactions. This scheme enables selection of more cost-effective platforms for, as well as independent scaling of, each of these two elements. Service providers can also select optimized topological locations of Serving Gateways 710 within the network independent of the locations of MMEs 708 in order to reduce optimized bandwidth latencies and avoid concentrated points of failure.

As seen in FIG. 7B, the E-UTRAN (e.g., eNB) 712 interfaces with UE 101 via LTE-Uu. The E-UTRAN 712 supports LTE air interface and includes functions for radio resource control (RRC) functionality corresponding to the control plane MME 708. The E-UTRAN 712 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 708, as a key control node, is responsible for managing mobility UE identifies and security parameters and paging procedure including retransmissions. The MME 708 is involved in the bearer activation/deactivation process and is also responsible for choosing Serving Gateway 710 for the UE 101. MME 708 functions include Non Access Stratum (NAS) signaling and related security. MME 708 checks the authorization of the UE 101 to camp on the service provider's Public Land Mobile Network (PLMN) and enforces UE 101 roaming restrictions. The MME 708 also provides the control plane function for mobility between LTE and 2G/3G access networks with the S3 interface terminating at the MME 708 from the SGSN (Serving GPRS Support Node) 714.

The SGSN 714 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 708 and HSS (Home Subscriber Server) 716. The S10 interface between MMEs 708 provides MME relocation and MME 708 to MME 708 information transfer. The Serving Gateway 710 is the node that terminates the interface towards the E-UTRAN 712 via S1-U.

The S1-U interface provides a per bearer user plane tunneling between the E-UTRAN 712 and Serving Gateway 710. It contains support for path switching during handover between eNBs 103. The S4 interface provides the user plane with related control and mobility support between SGSN 714 and the 3GPP Anchor function of Serving Gateway 710.

The S12 is an interface between UTRAN 406 and Serving Gateway 710. Packet Data Network (PDN) Gateway 718 provides connectivity to the UE 101 to external packet data networks by being the point of exit and entry of traffic for the UE 101. The PDN Gateway 718 performs policy enforcement, packet filtering for each user, charging support, lawful interception and packet screening. Another role of the PDN Gateway 718 is to act as the anchor for mobility between 3GPP and non-3GPP technologies such as WiMax and 8GPP2 (CDMA 1X and EvDO (Evolution Data Only)).

The S7 interface provides transfer of QoS policy and charging rules from PCRF (Policy and Charging Role Function) 720 to Policy and Charging Enforcement Function (PCEF) in the PDN Gateway 718. The SGi interface is the interface between the PDN Gateway and the operator's IP services including packet data network 722. Packet data network 722 may be an operator external public or private packet data network or an intra operator packet data network, e.g., for provision of IMS (IP Multimedia Subsystem) services. Rx+ is the interface between the PCRF and the packet data network 722.

Figure 7C:
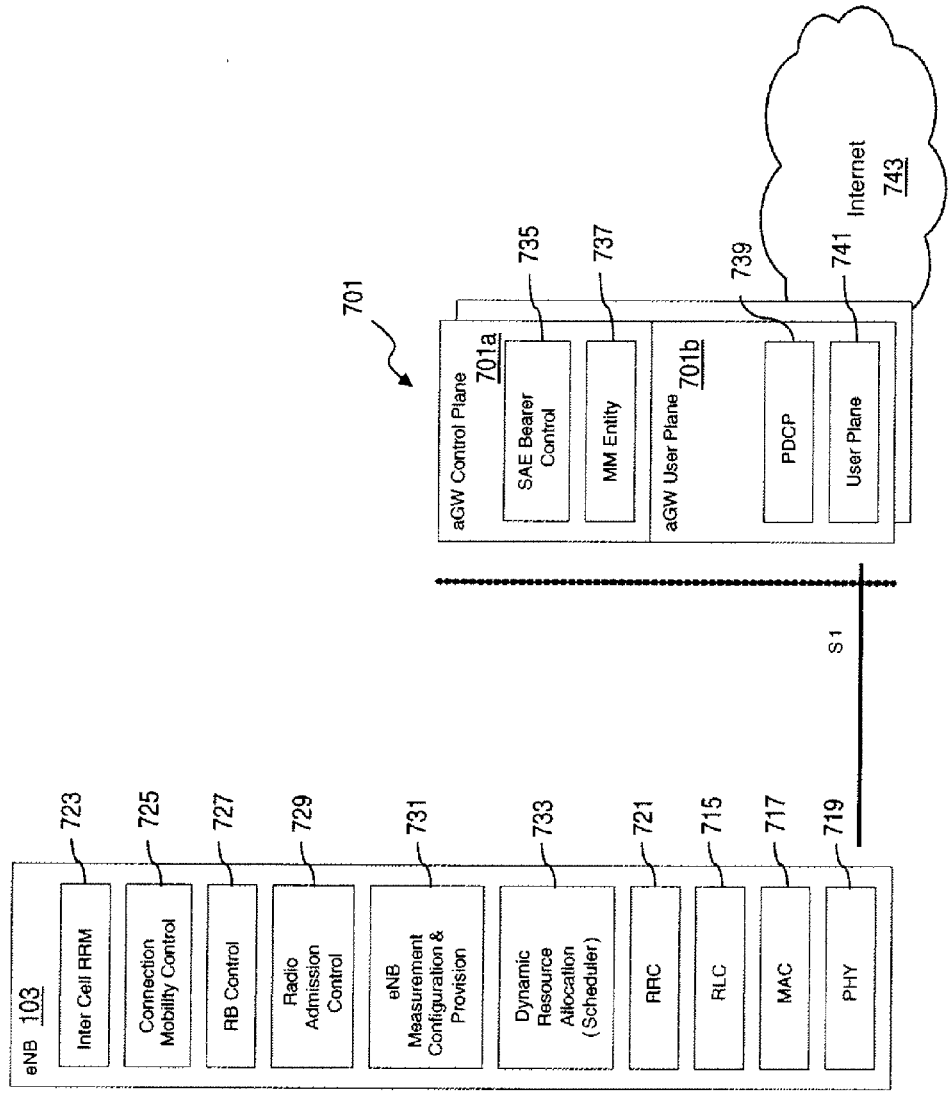

As seen in FIG. 7C, the eNB 103 utilizes an E-UTRA (Evolved Universal Terrestrial Radio Access) (user plane, e.g., RLC (Radio Link Control) 715, MAC (Media Access Control) 717, and PHY (Physical) 719, as well as a control plane (e.g., RRC 721)). The eNB 103 also includes the following functions: Inter Cell RRM (Radio Resource Management) 723, Connection Mobility Control 725, RB (Radio Bearer) Control 727, Radio Admission Control 729, eNB Measurement Configuration and Provision 731, and Dynamic Resource Allocation (Scheduler) 733.

The eNB 103 communicates with the aGW 701 (Access Gateway) via an S1 interface. The aGW 701 includes a User Plane 701*a* and a Control plane 701*b*. The control plane 701*b* provides the following components: SAE (System Architecture Evolution) Bearer Control 735 and MM (Mobile Management) Entity 737. The user plane 701*b* includes a PDCP (Packet Data Convergence Protocol) 439 and a user plane functions 741. It is noted that the functionality of the aGW 701 can also be provided by a combination of a serving gateway (SGW) and a packet data network (PDN) GW. The aGW 701 can also interface with a packet network, such as the Internet 743.

Figure 7D:
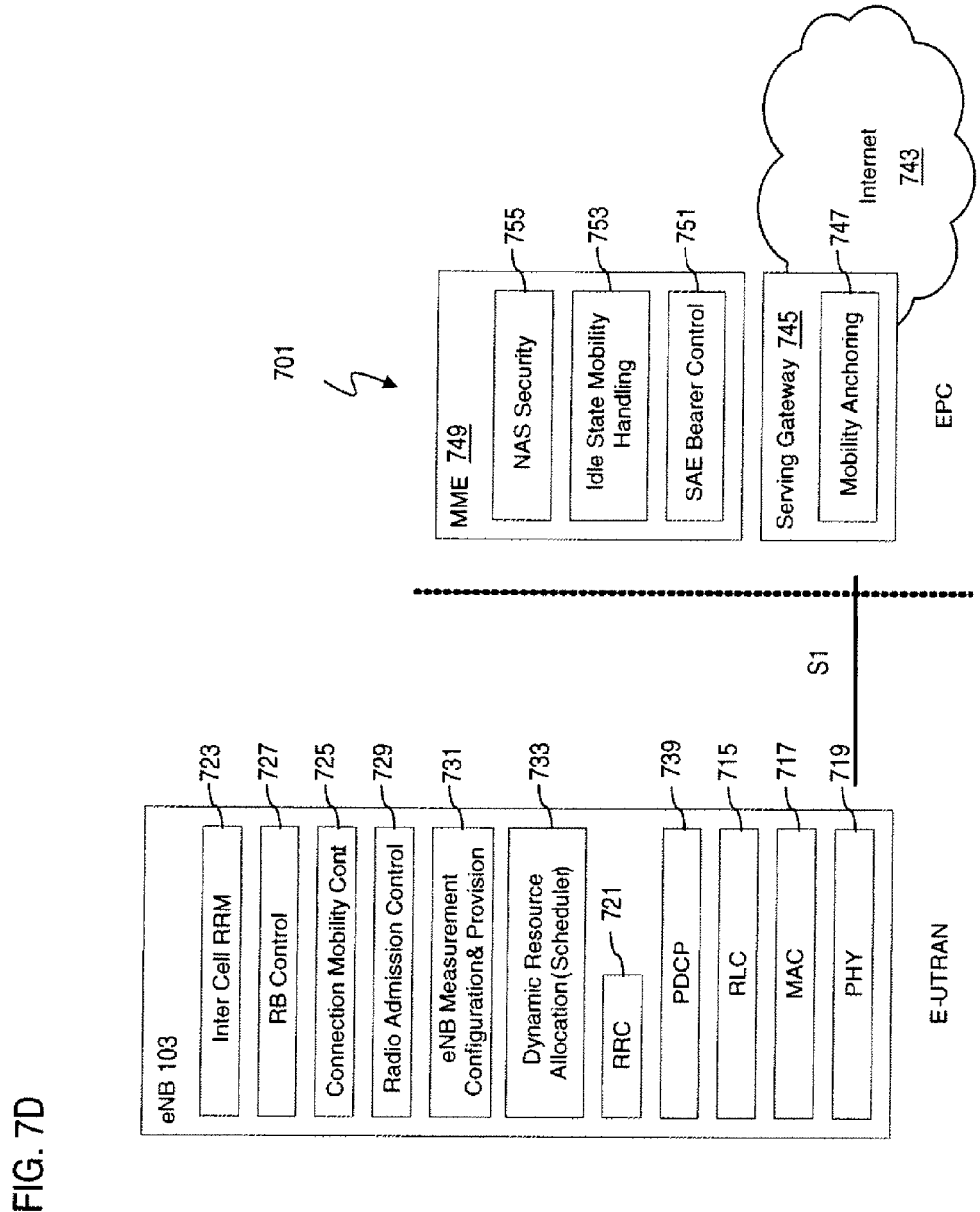

In an alternative embodiment, as shown in FIG. 7D, the PDCP (Packet Data Convergence Protocol) functionality can reside in the eNB 103 rather than the GW 701. Other than this PDCP capability, the eNB functions of FIG. 7C are also provided in this architecture.

In the system of FIG. 7D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 103 interfaces via the SI to the Serving Gateway 745, which includes a Mobility Anchoring function 747. According to this architecture, the MME (Mobility Management Entity) 749 provides SAE (System Architecture Evolution) Bearer Control 751, Idle State Mobility Handling 753, and NAS (Non-Access Stratum) Security 755.

One of ordinary skill in the art would recognize that the processes for providing random access window configuration may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 8.

Figure 8:
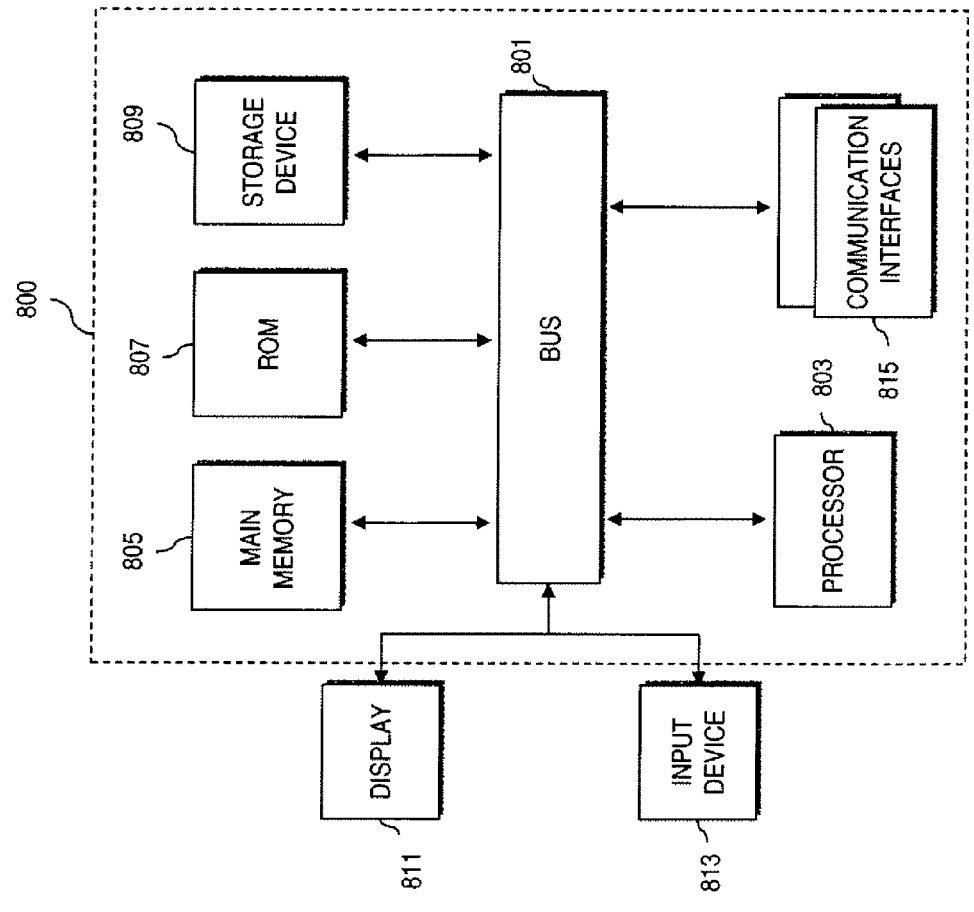
FIG. 8 is a diagram of hardware that can be used to implement an embodiment of the invention.

FIG. 8 illustrates exemplary hardware upon which various embodiments of the invention can be implemented. A computing system 800 includes a bus 801 or other communication mechanism for communicating information and a processor 803 coupled to the bus 801 for processing information. The computing system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computing system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computing system 800 may be coupled with the bus 801 to a display 811, such as a liquid crystal display, or active matrix display, for displaying information to a user. An input device 813, such as a keyboard including alphanumeric and other keys, may be coupled to the bus 801 for communicating information and command selections to the processor 803. The input device 813 can include a cursor control, such as a mouse, a trackball, or cursor direction keys, for communicating direction information and command selections to the processor 803 and for controlling cursor movement on the display 811.

According to various embodiments of the invention, the processes described herein can be provided by the computing system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 800 also includes at least one communication interface 815 coupled to bus 801. The communication interface 815 provides a two-way data communication coupling to a network link (not shown). The communication interface 815 sends and receives electrical, electromagnetic, or optical signals that carry digital data streams representing various types of information. Further, the communication interface 815 can include peripheral interface devices, such as a Universal Serial Bus (USB) interface, a PCMCIA (Personal Computer Memory Card International Association) interface, etc.

The processor 803 may execute the transmitted code while being received and/or store the code in the storage device 809, or other non-volatile storage for later execution. In this manner, the computing system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
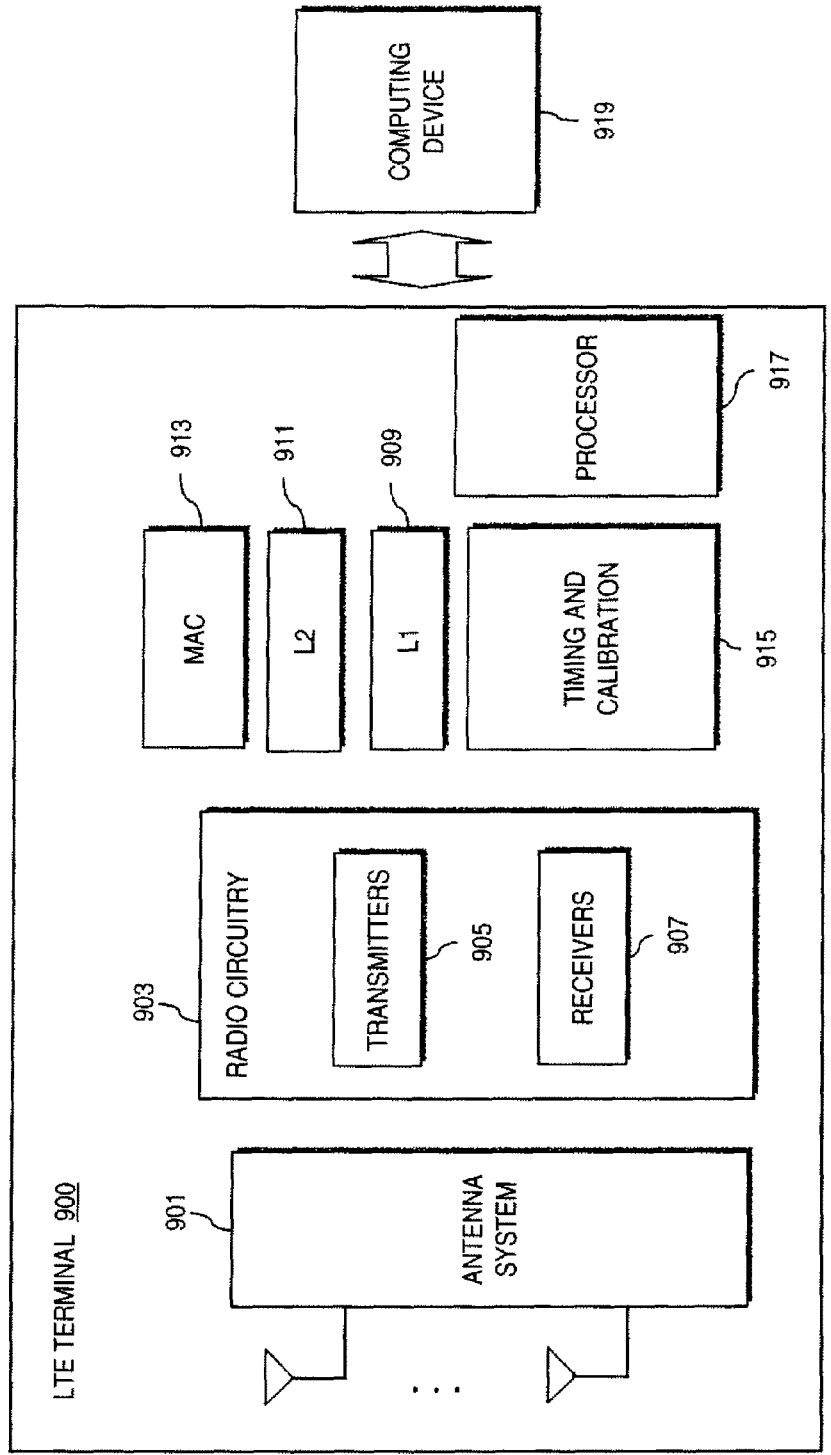
FIG. 9 is a diagram of exemplary components of an LTE terminal configured to operate in the systems of FIGS. 7A-7D, according to an embodiment of the invention.

FIG. 9 is a diagram of exemplary components of an LTE terminal capable of operating in the systems of FIGS. 7A-7D, according to an embodiment of the invention. An LTE terminal 900 is configured to operate in a Multiple Input Multiple Output (MIMO) system. Consequently, an antenna system 901 provides for multiple antennas to receive and transmit signals. The antenna system 901 is coupled to radio circuitry 903, which includes multiple transmitters 905 and receivers 907. The radio circuitry encompasses all of the Radio Frequency (RF) circuitry as well as base-band processing circuitry. As shown, layer-1 (L1) and layer-2 (L2) processing are provided by units 909 and 911, respectively. Optionally, layer-3 functions can be provided (not shown). Module 913 executes all MAC layer functions. A timing and calibration module 915 maintains proper timing by interfacing, for example, an external timing reference (not shown). Additionally, a processor 917 is included. Under this scenario, the LTE terminal 900 communicates with a computing device 919, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    initiating transmission of one or more random access preambles in one or more respective random access channels within a single uplink subframe; and
    monitoring, with a processor, a physical downlink control channel for a response to the transmission during one or more of a plurality of random access response windows, the one or more random access response windows corresponding to each respective random access channel,
    wherein each of the plurality of random access response windows is offset from others of the plurality of random access response windows by an estimated processing time margin for processing the random access preambles and preparing the response.

2. A method of claim 1, wherein the one or more random access response windows correspond to one or more respective random access channels.

3. A method of claim 1, wherein the random access channels are established over a radio network that has a long term evolution (LTE) architecture.

4. A method of claim 1, wherein each of the random access response windows is defined by using a begin window parameter and an end window parameter.

5. A method of claim 4, wherein the begin window parameter is offset at least in part by the estimated processing time margin, an index corresponding to the respective random access channel, a fixed time interval after the end of the transmission of the respective random access preamble, or a combination thereof.

6. A method of claim 4, wherein the end window parameter is fixed time interval after the begin time window parameter.

7. An apparatus comprising:
    at least one processor; and
    at least one memory including computer program code,
    the at least one memory and the computer program code configured to, with the at least one processor, cause the apparatus to perform at least the following,
    initiate transmission of one or more random access preambles in one or more
    respective random access channels within a single uplink subframe, and
    monitor a physical downlink control channel for a response to the transmission during one or more of a plurality of random access response windows, the one or more random access response windows corresponding to each respective random access channel,
    wherein each of the plurality of random access response windows is offset from others of the plurality of random access response windows by an estimated processing time margin for processing the random access preambles and preparing the response.

8. An apparatus of claim 7, wherein the one or more random access response windows correspond to one or more respective random access channels.

9. An apparatus of claim 7, wherein the random access channels are established over a radio network that has a long term evolution (LTE) architecture.

10. An apparatus of claim 7, wherein each of the random access response windows is defined by using a begin window parameter and an end window parameter.

11. An apparatus of claim 10, wherein the begin window parameter is offset at least in part by the estimated processing time margin, an index corresponding to the respective random access channel, a fixed time interval after the end of the transmission of the respective random access preamble, or a combination thereof.

12. An apparatus of claim 10, wherein the end window parameter is fixed time interval after the begin time window parameter.

13. An apparatus comprising:
    at least one processor; and
    at least one memory including computer program code,
    the at least one memory and the computer program code configured to, with the at least one processor, cause the apparatus to perform at least the following,
    receive a plurality of random access preambles corresponding to a plurality of random access channels within a single uplink subframe,
    determine an estimated processing time margin for processing the random access preambles and preparing a response, and
    determine an offset for each of a plurality of random access response windows from others of the plurality of random access response windows, the random access response windows corresponding to the random access channels, and the offset being based on the estimated processing time margin.

14. An apparatus of claim 13, wherein the apparatus is further caused to: generate a response to each of the random access preambles.

15. An apparatus of claim 14, wherein the apparatus is further caused to: initiate transmission of the responses over a downlink control channel.

16. An apparatus of claim 13, wherein the random access response windows specify a duration for a user equipment to monitor a physical downlink control channel.

17. An apparatus of claim 13, wherein each random access response window is defined using a begin window parameter and an end window parameter, and the begin window parameter is variably offset.

18. An apparatus of claim 13, wherein each random access response window is defined using a begin window parameter and an end window parameter, and the begin window parameter is offset by a fixed time interval after the end of the transmission of the respective random access preamble.

19. An apparatus of claim 13, wherein each random access response window is defined using a begin window parameter and an end window parameter, and the begin window parameter is offset at least in part an index corresponding to the respective random access channel.

20. An apparatus of claim 19, wherein the offset produces non-overlapping random access response windows.

* * * * *

UNITED STATES PATENT AND TRADEMARK OFFICE
CERTIFICATE OF CORRECTION

Page 1 of 1

PATENT NO.       : 8,111,656 B2
APPLICATION NO.  : 12/434245
DATED            : February 7, 2012
INVENTOR(S)      : Che et al.

It is certified that error appears in the above-identified patent and that said Letters Patent is hereby corrected as shown below:

Title page,
Item (60) Related U.S. Application Data
"application No. 60/051,559" should read --application No. 61/051,559--.

Signed and Sealed this
Eleventh Day of December, 2012

David J. Kappos
*Director of the United States Patent and Trademark Office*